No. 842,897. PATENTED FEB. 5, 1907.
T. H. MACDONALD.
COMBINED RECORDER AND REPRODUCER.
APPLICATION FILED JAN. 16, 1906.
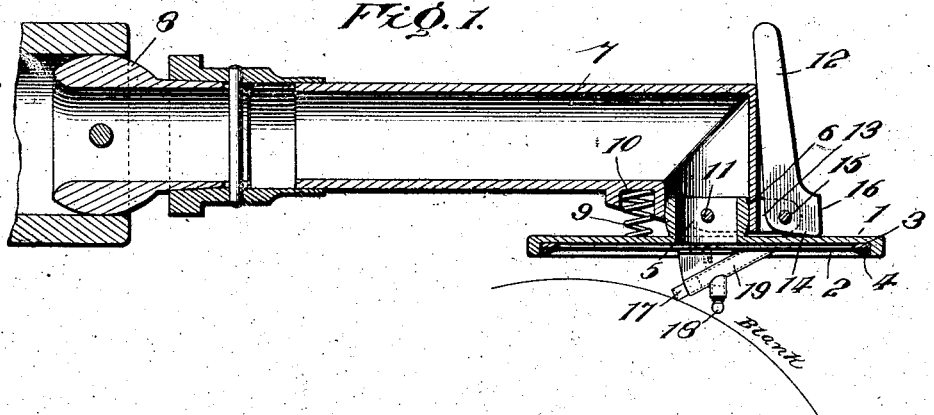
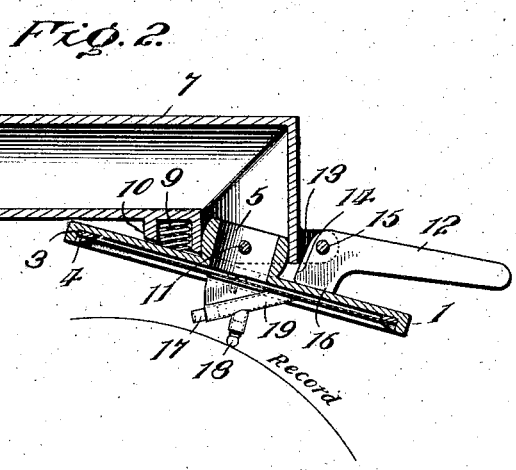
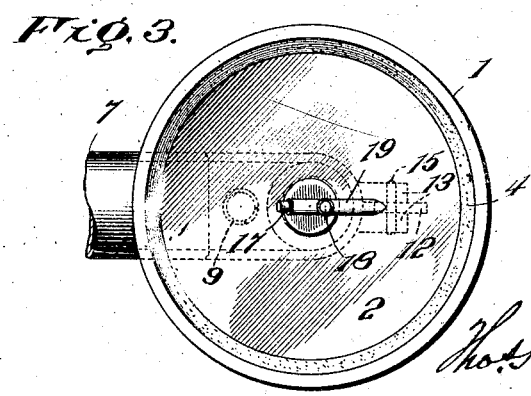

UNITED STATES PATENT OFFICE.

THOMAS H. MACDONALD, OF BRIDGEPORT, CONNECTICUT, ASSIGNOR TO AMERICAN GRAPHOPHONE COMPANY, OF BRIDGEPORT, CONNECTICUT, A CORPORATION OF WEST VIRGINIA.

COMBINED RECORDER AND REPRODUCER.

No. 842,897.     Specification of Letters Patent.     Patented Feb. 5, 1907.

Application filed January 16, 1906. Serial No. 296,365.

*To all whom it may concern:*

Be it known that I, THOMAS H. MACDONALD, of Bridgeport, Connecticut, have invented a new and useful Improvement in a Combined Recorder and Reproducer, which invention is fully set forth in the following specification.

This invention relates to recorders and reproducers for talking-machines, and has for its object to obtain in one structure a device which can be used at will in connection with any suitable record-tablet, either for recording sound-waves or for the reproduction of sound previously recorded.

With this object in view the invention consists of a combined recorder and reproducer, comprising a single diaphragm with a recording-style and a reproducing-style both connected to the diaphragm, the whole being arranged so that the recording-style or the reproducing-style can be shifted, the one out of contact with the record-tablet and the other into contact, or vice versa.

More specifically stated, the invention consists of a single diaphragm, preferably mounted in a suitable casing or head, which casing or head is capable of being tilted for a slight distance upon a pivot or axis, on which it is supported, so that the diaphragm can be shifted into two different planes. On this diaphragm is secured a cutting-style for the purpose of making a record, and a reproducing-style (preferably rounded or spherical in form) for rubbing over a previously-made record to reproduce sound, the relative position of the two styles being such that when the diaphragm lies in one plane the recording-style only will rest against the record-tablet, and when the diaphragm lies in the other plane the recording-style will be shifted out of contact with the record-tablet, and the reproducing-style will be brought into contact therewith. Any suitable means may be employed for shifting and retaining the diaphragm into either one of the two positions above mentioned. As here shown, the diaphragm head or casing is connected to a tubular shank, whose exterior surface is approximately that of a zone of a sphere, said shank being inserted a short distance into the open end of the conveying-tube of the reproducer and pivotally connected to said tube. Reacting between the diaphragm-casing and a suitable seat, preferably formed in the wall of the tube of the reproducer, is a stiff spring, while on the other side a cam-lever is pivoted to the walls of the tube, the parts being so adjusted that when the cam-lever is thrown into one position it permits the spring to throw the diaphragm-casing, and with it the diaphragm, into position to bring the recording-style in contact with the record blank or tablet, the tension of the spring being resisted on the opposite side of the cam-lever of other suitable abutment. When it is desired to shift the recording-style out of contact with the record-tablet and bring the reproducing-style in contact therewith, the cam-lever is thrown down or shifted on its pivot, thereby tilting the diaphragm-casing, and with it the diaphragm, into a different plane, and compressing the spring above mentioned. This action brings the reproducer style into operative position on the record-tablet.

The inventive idea involved may receive a variety of mechanical expressions, one of which, for the purpose of illustration, is shown in the accompanying drawings, but it is to be understood that such drawings are for the purpose of illustration only, and are not designed to define the limits of the invention, reference being had to the claims for this purpose. It will also be understood that some features of the invention are not limited to a structure wherein both a recording and a reproducing style is employed.

In the drawings, Figure 1 is a vertical section through the center of the reproducer-head and the neck or tube supporting the same, showing the diaphragm in a position to bring the recording-style in contact with the record tablet or blank. Fig. 2 is a view similar to Fig. 1 with the parts in position to throw the recording-style out of contact with the record-tablet and bring the reproducing-style into operative relation therewith, and Fig. 3 is a bottom plan view of Fig. 1.

Referring to the drawings, in which like reference-numerals indicate like parts, 1 is the reproducer head or casing, having the diaphragm 2, mounted therein in any suitable or usual way—as, for example, between gaskets 3 and 4. This diaphragm-casing 1 is provided at its back with a neck 5, having the exterior portion of its walls rounded, preferably into form approximating that of a zone of a sphere, as indicated at 6. This spherical portion of the neck 5 fits within the open end of the reproducer neck or tube 7, which is here shown in the form of a tube bent at right angles and supported at the end opposite to the reproducer-head by a suitable joint 8, though any other desired form of joint between the neck 7 and its support may be employed. The neck 5 is secured in the end of tube 7 by a pivot 11, that is parallel with the diaphragm. The spring 9 reacts between the back of the reproducer-casing and any suitable abutment 10, here shown as formed on the wall of the neck 7. This spring 9 takes bearing upon the reproducer-casing at one side of pivot 11. On the opposite side of the neck 5 from the spring 9 a cam-lever 12, here shown as a bell-crank lever, is pivoted to an ear or lug 13, projecting from the wall of the tubular neck 7. The form of the cam-lever 12 and its position with relation to the diaphragm-casing 1 is such that when it is in one position, as shown in Fig. 1, the face 14 of the lever 12 bears against the back of the diaphragm-casing, and this face 14 is at such a distance from the pivot 15 of the lever 12 as to allow the spring 9 to expand and throw the casing into a position here shown as approximately parallel with the axis of the tube 7. When, however, the cam-lever 12 is shifted into the position shown in Fig. 2, the face 16 bears upon the back of the diaphragm-casing, and said casing is shifted to a position to compress the spring 9 and throw the said casing into a plane at an angle to that of the axis of tube 7. This tilting of the casing upon its pivot is due to the fact that the face 16 of lever 12 is farther away from the pivot 15 than is face 14.

Two styles—viz., a recording-style 17 and a reproducing-style 18—are suitably connected to the diaphragm, and the parts are so arranged that when the diaphragm is in one position one of the styles is in operative relation with the record-tablet, and when the diaphragm is shifted into the other position—as, for example, when it is shifted from the position shown in Fig. 1 to that shown in Fig. 2—the first-mentioned style is thrown out of operative relation with the record-tablet and the other style is thrown into operative relation, all as will be readily understood by inspection of Figs. 1 and 2. Any suitable means for connecting the styles 17 and 18 to the diaphragm may be employed. As here shown, such means are in the form of a clip 19, of metal or other suitable material, having a plurality of sockets of chambers for receiving one end of the respective styles, the styles being so arranged that only one of them can contact with the record-tablet at a time. This clip 19 is secured to the face of the style in any suitable way, as by cement. The particular form of clip 19 here shown will be recognized as being substantially that shown and described in my United States Patent No. 683,958, with the addition thereto of a suitable socket for holding the reproducing-style 18.

Having thus described my invention, what I claim is—

1. In a talking-machine, a combined recorder and reproducer comprising a single diaphragm mounted to tilt upon a given axis, and a recording and a reproducing style secured to said diaphragm, a spring acting to turn the diaphragm in one direction, and means operable to turn the diaphragm against the tension of said spring.

2. In a talking-machine, the combination of a pivotally-mounted diaphragm-casing, a diaphragm supported therein, a spring reacting between said casing and a suitable abutment, a style connected to said diaphragm, and means for throwing and holding said casing against the tension of said spring.

3. In a talking-machine, the combination of a diaphragm-casing having a tubular neck, a sound-conveying tube or opening to which said neck is pivotally connected, a diaphragm in said casing, a style mounted on said diaphragm, and means tilting said casing upon said pivot into a plurality of planes.

4. In a talking-machine, the combination of a diaphragm-casing having a tubular neck whose outer surface is in the form of a zone or a sphere, a sound-conveying tube within which said neck is pivotally connected, a diaphragm in said casing, a style mounted on said diaphragm, and means shifting said casing upon said pivot into a plurality of planes.

5. In a talking-machine, the combination of a diaphragm-casing having a tubular neck whose exterior is formed on the lines of a sphere, a sound-conveying tube within which said neck is pivotally mounted, a diaphragm in said casing, a plurality of styles mounted on said diaphragm, and means shifting said casing upon said pivot into a plurality of planes.

6. In a talking-machine, the combination of a diaphragm-casing, a sound-conveying tube to which said casing is pivotally connected, a diaphragm in said casing, a recording-style mounted on said diaphragm, a spring bearing on one side of said casing and a cam-lever bearing on the other side thereof.

7. In a talking-machine, a diaphragm-casing mounted to turn upon an axis, a diaphragm in said casing, a style connected to said diaphragm, a spring bearing against the casing and tending to turn it upon its axis, and means holding said casing against the action of the spring.

8. In a talking-machine, the combination with a sound-conveying tube, of a casing containing a diaphragm pivoted in the end of said tube by a pivot parallel with said diaphragm, a recording-style and a reproducing-style fast upon said diaphragm, and devices tilting said casing and said diaphragm upon said pivot, as and for the purpose described.

9. In a talking-machine, the combination with a sound-conveying tube, of a casing carrying a diaphragm and pivoted within the end of said tube by a pivot parallel with said diaphragm, a recording-style and a reproducing-style fast upon said diaphragm, and oppositely-disposed devices consisting respectively of a cam and a spring tilting said casing and diaphragm upon said pivot, as and for the purpose described.

In testimony whereof I have signed this specification in the presence of two subscribing witnesses.

THOMAS H. MACDONALD.

Witnesses:
A. B. KEOUGH,
C. A. GIBNER.